US008984112B2

(12) United States Patent
Li et al.

(10) Patent No.: US 8,984,112 B2
(45) Date of Patent: Mar. 17, 2015

(54) INTERNET ADDRESS INFORMATION PROCESSING METHOD, APPARATUS, AND INTERNET SYSTEM (75) Inventors: Xiaodong Li, Beijing (CN); Wei Mao, Beijing (CN); Ye Tian, Beijing (CN); Wei Wang, Beijing (CN); Tao Chen, Beijing (CN); Di Ma, Beijing (CN)

(73) Assignee: Computer Network Information Centre, Chinese Academy of Sciences, Beijing (CN)

( * ) Notice: Subject to any disclaimer, the term of this patent is extended or adjusted under 35 U.S.C. 154(b) by 179 days.

(21) Appl. No.: 13/554,992

(22) Filed: Jul. 20, 2012

(65) Prior Publication Data

US 2012/0290700 A1    Nov. 15, 2012

Related U.S. Application Data (63) Continuation of application No. PCT/CN2010/074477, filed on Jun. 25, 2010.

(30) Foreign Application Priority Data

Jan. 20, 2010    (CN) .......................... 2010 1 0034293

(51) Int. Cl.
*G06F 15/173*    (2006.01)
*H04L 29/12*    (2006.01)

(52) U.S. Cl.
CPC ............ *H04L 61/6059* (2013.01); *H04L 61/10* (2013.01); *H04L 61/103* (2013.01); *H04L 61/2007* (2013.01); *H04L 61/6068* (2013.01)
USPC ............................. 709/223; 709/203; 709/224

(58) Field of Classification Search
CPC ..... H04L 61/10; H04L 61/103; H04L 61/106; H04L 61/35; H04L 61/309; H04L 61/3095; H04L 61/6004; H04L 61/6009; H04L 61/6013; H04L 61/6059; H04L 61/6068
USPC .......................... 709/203, 217, 223, 224, 229
See application file for complete search history.

(56) References Cited

U.S. PATENT DOCUMENTS 6,141,325 A    10/2000    Gerstel .......................... 370/238
6,389,462 B1 *    5/2002    Cohen et al. ................... 709/218
(Continued)

FOREIGN PATENT DOCUMENTS

| CN | 1477884 A | 2/2004 |
| CN | 1514605 A | 7/2004 |
| CN | 1832428 A | 9/2006 |
| WO | WO 2010/002782 | 1/2010 |

OTHER PUBLICATIONS

International Search Report of International Application No. PCT/CN2010/074477, dated Oct. 28, 2010.
(Continued)

*Primary Examiner* — Thu Ha Nguyen
(74) *Attorney, Agent, or Firm* — J.C. Patents (57) ABSTRACT Embodiments of the present invention provide an Internet address information processing method, apparatus and an Internet system. The method includes: receiving, by a first leaf node, a query request message containing an IP address to be queried sent by user equipment, and performing query or sending a query request message to an intermediate layer node; obtaining, by the intermediate layer node, an IP address of a second leaf node according to a prefix of the IP address to be queried to send the query request message to the second leaf node; and finally, sending, by the second leaf node, address information about the IP address after receiving the query request message. Embodiments of the present invention further provide corresponding apparatus and system. The method, apparatus, and system provided by the present invention are capable of implementing real-time query for address information about IP addresses.

18 Claims, 5 Drawing Sheets

(56) References Cited

U.S. PATENT DOCUMENTS

| | | | |
|---|---|---|---|
| 7,330,726 B2* | 2/2008 | Vare et al. | 455/432.2 |
| 8,572,217 B2* | 10/2013 | Verma et al. | 709/220 |
| 8,645,509 B2* | 2/2014 | Carriere | 709/220 |
| 2005/0018645 A1* | 1/2005 | Mustonen et al. | 370/349 |
| 2008/0049765 A1* | 2/2008 | Sadler | 370/401 |
| 2008/0151906 A1* | 6/2008 | Kolli et al. | 370/395.31 |
| 2009/0210518 A1* | 8/2009 | Verma et al. | 709/220 |
| 2010/0274924 A1* | 10/2010 | Allan et al. | 709/245 |
| 2011/0191459 A1* | 8/2011 | Joshi | 709/223 |
| 2012/0089713 A1* | 4/2012 | Carriere | 709/222 |
| 2012/0290693 A1* | 11/2012 | Karasaridis et al. | 709/222 |
| 2012/0324089 A1* | 12/2012 | Joshi | 709/223 |

OTHER PUBLICATIONS

Xin-Chang Zhang et al., "Extension of RPSL for searching detailed and registered IP address information" Application Research of Computers, vol. 25, No. 7, Jul. 2008, pp. 2132-2134.

* cited by examiner

INTERNET ADDRESS INFORMATION PROCESSING METHOD, APPARATUS, AND INTERNET SYSTEM

CROSS-REFERENCE TO RELATED APPLICATIONS

This application is a continuation of International Application No. PCT/CN2010/074477, filed on Jun. 25, 2010, which claims the priority benefit of China Patent Application No. 201010034293.7, filed on Jan. 20, 2010. The contents of the above identified applications are incorporated herein by reference in their entirety.

FIELD OF THE INVENTION

Embodiments of the present invention relate to the field of Internet technologies and, in particular, to an Internet address information processing method, apparatus and an Internet system.

BACKGROUND OF THE INVENTION

IPv6 is a next-generation Internet technology. The length of an IPv6 address is 128 bits. As specified by the Internet Engineering Task Force IETF, a maximum of the first 64 bits of an IPv6 address may be used as a subnet prefix identifier. When a router forwards an IPv6 data packet, the router selects a forwarding path according to the first 64 bits. The last 64 bits of the IPv6 address is a host identifier, where the host identifier is used to identify a host using the address.

An IPv6 address is normally written in hexadecimal groups of 16 bits. Every two groups are separated by ":" and a specific format is as follows: 1234:5678:90ab:0000:0000: 0000:0000:cdef. Several zeros in the format may be omitted and an abbreviated form is 1234:5678:90ab::cdef. An expression of an IP address prefix thereof is 1234:5678:90ab::/48, indicating that the subnet prefix has 48 bits.

In a data communication process, an IP address plays a role in communication routing and in identifying hosts. For example, in various attacks in the current Internet, data communication on a lower layer is performed mainly by spoofing an IP address to avoid being tracked down. It is necessary to query IP addresses in real time. There are about 4.3 billion IPv4 addresses; however, the number of IPv6 addresses is much bigger, which is about $3.4 \times 10^{38}$. It is much more difficult to query IPv6 addresses than IPv4 addresses.

At present, IPv4 address information query is mainly based on IP address databases stored by operators. In a process of implementing the present invention, the inventors find that the prior art has at least the following problem: the IP address databases stored by the operators are static data, which cannot feed back in a timely manner the latest situation fed back by an IP address. Therefore, the IP address query method of the prior art cannot implement real-time query.

SUMMARY OF THE INVENTION

Embodiments of the present invention provide an Internet address information processing method, apparatus and an Internet system to overcome the shortcoming of failing to query IP address information in real time in the prior art, thereby implementing real-time query for IP address information.

Embodiments of the present invention provide an Internet address information processing method, including:

receiving, by a first leaf node, a query request message containing an IP address to be queried sent by user equipment, querying whether the IP address is an IP address assigned by the first leaf node; and if yes, sending address information about the IP address to the user equipment; if no, sending a query request containing at least a prefix of the IP address to be queried to an intermediate layer node, where the intermediate layer node stores an IP address prefix of the intermediate layer node itself and IP address prefixes assigned by the intermediate layer node itself;

obtaining, by the intermediate layer node, an IP address of a second leaf node according to the prefix of the IP address to be queried to send the query request message containing the IP address to be queried to the second leaf node, where the second leaf node is a node assigning the IP address to be queried to the user equipment, and stores address information about IP addresses assigned thereby; and sending, by the second leaf node, the address information about the IP address after receiving the query request message containing the IP address to be queried.

Embodiments of the present invention further provide an Internet system, including a first leaf node, a second leaf node, and at least one intermediate layer node, where the first leaf node is configured to receive a query request message containing an IP address to be queried sent by user equipment, query whether the IP address to be queried is an IP address assigned by the first leaf node; and if yes, send address information about the IP address to be queried to the user equipment; if no, send a query request containing at least a prefix of the IP address to be queried to the intermediate layer node, where the intermediate layer node stores an IP address prefix of the intermediate layer node itself and IP address prefixes assigned by the intermediate layer node itself;

the intermediate layer node is further configured to obtain an IP address of the second leaf node according to the prefix of the IP address to be queried, where the second leaf node is a node assigning the IP address to be queried to the user equipment, and stores address information about the IP address to be queried; and the second leaf node is further configured to send the address information about the IP address after receiving the query request message containing the IP address to be queried.

Embodiments of the present invention further provide an Internet address information processing apparatus, including a routing module, an address assigning module, and an information storing module, where the routing module is configured to implement a data link with user equipment and an upper layer node, and receive an IP address configuration request message sent by the user equipment, receive a query request message containing an IP address to be queried sent by the user equipment, or forward the query request message containing an IP address to be queried to the upper layer node;

the address assigning module is configured to receive the IP address configuration request message forwarded by the routing module and assign an IP address to the user equipment; and the information storing module is configured to store the IP address assigned by the address assigning module to the user equipment and user information corresponding to the IP address, and when receiving the query request message containing the IP address to be queried, send the user information corresponding to the IP address to be queried, where the user information is address information about the IP address.

Embodiments of the present invention further provide another Internet address information processing apparatus, including a routing module, a prefix assigning module, and an information storing module, where the routing module is configured to implement a data link with an upper layer node or a lower layer node in an Internet system, receive an IP address prefix configuration message sent by the upper layer node, after the prefix assigning module assigns an IP address prefix to the lower layer node, send the IP address prefix configuration message to the lower layer node, and receive a query request containing at least a prefix of an IP address to be queried sent by the upper layer node or the lower layer node;

the prefix assigning module is configured to receive the IP address prefix configuration message forwarded by the routing module, and assign an IP address prefix to the lower layer node according to an address prefix of the node itself assigned by the upper layer node; and the information storing module is configured to store the IP address prefix assigned by the prefix assigning module to the lower layer node and an IP address of an information storing module of the lower layer node, and after receiving the query request containing at least the prefix of the IP address to be queried forwarded by the routing module, perform query and send a query result.

The Internet address information processing method, apparatus and the Internet system provided by embodiments of the present invention divide an Internet system into leaf nodes and intermediate layer nodes, where after receiving a query request message initiated by user equipment for querying address information about an IP address, a first leaf node determines an IP address of a second leaf node assigning the IP address according to a prefix of an IP address to be queried, and obtains the address information about the IP address to be queried from the second leaf node. The second leaf node is a node directly responsible for assigning IP addresses; therefore, real-time query for address information about IP addresses can be implemented.

BRIEF DESCRIPTION OF THE DRAWINGS

In order to illustrate the technical solutions in embodiments of the present invention or the prior art more clearly, accompanying drawings for the embodiments of the present invention or for the prior art are illustrated briefly in the following. It is evident that the accompanying drawings are only some embodiments of the present invention, and persons skilled in the art may obtain other drawings according to the accompanying drawings without creative work.

DETAILED DESCRIPTION OF THE EMBODIMENTS

To make the objective, technical solutions, and advantages of embodiments of the present invention clearer, the technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons skilled in the art without creative efforts shall fall within the protection scope of the present invention.

Figure 1:
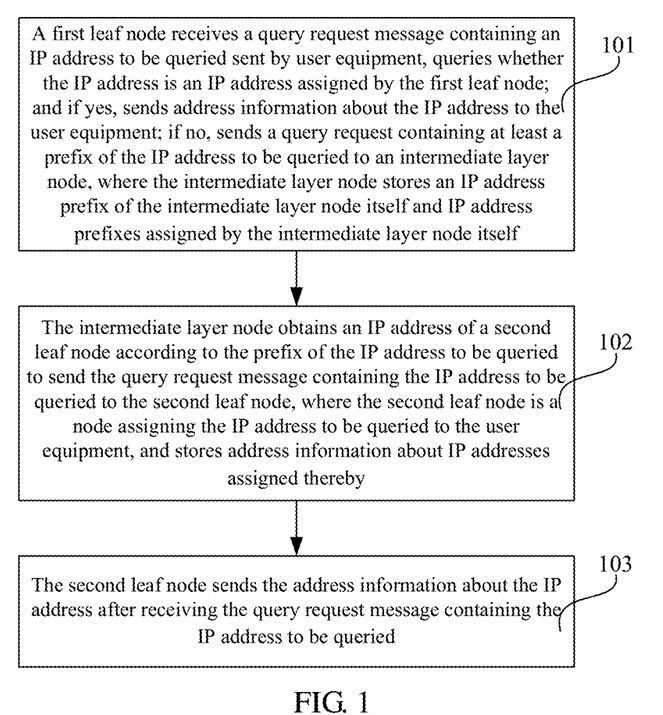
FIG. 1 is a schematic flowchart of an embodiment of an Internet address information processing method according to the present invention.

To encounter the problem of failing to query an IP address in real time in the prior art, embodiments of the present invention provide an Internet address information processing method. FIG. 1 is a schematic flowchart of an embodiment of an Internet address information processing method according to the present invention. As shown in FIG. 1, the method includes the following steps:

Step 101. A first leaf node receives a query request message containing an IP address to be queried sent by user equipment, queries whether the IP address is an IP address assigned by the first leaf node; and if yes, sends address information about the IP address to the user equipment; if no, sends a query request containing at least a prefix of the IP address to be queried to an intermediate layer node, where the intermediate layer node stores an IP address prefix of the intermediate layer node itself and IP address prefixes assigned by the intermediate layer node itself;

Step 102. The intermediate layer node obtains an IP address of a second leaf node according to the prefix of the IP address to be queried to send the query request message containing the IP address to be queried to the second leaf node, where the second leaf node is a node assigning the IP address to be queried to the user equipment, and stores address information about IP addresses assigned thereby; and Step 103. The second leaf node sends the address information about the IP address after receiving the query request message containing the IP address to be queried.

In the embodiment of the present invention, an Internet system is divided into leaf nodes and intermediate layer nodes, where the leaf nodes are directly connected to user equipment, assign an IP address to the user equipment, and store address information about IP addresses assigned thereby; and an intermediate layer node is capable of assigning an IP address prefix to a lower layer node and storing an IP address prefix of the intermediate layer node itself and IP address prefixes assigned by the intermediate layer node itself. In the embodiment, after receiving the query request message initiated by the user equipment for querying address information (that is, user information about a user using the IP address) about the IP address, the first leaf node determines the IP address of the second leaf node assigning the IP address according to the prefix of the IP address to be queried, and obtains the address information about the IP address to be queried from the second leaf node. The second leaf node is a node directly responsible for assigning IP addresses; therefore, real-time query for address information about IP addresses can be implemented.

In the above embodiment, the first leaf node first determines whether the IP address to be queried is an IP address assigned by the first leaf node itself, and if no, sends a query request to the intermediate layer node, where the intermediate layer node stores IP address prefixes of the intermediate layer node itself and lower layer nodes. Therefore, by layer-bylayer query according to the prefix of the IP address to be queried, the IP address of the second leaf node corresponding to the prefix of the IP address can be found, and then the IP address to be queried is sent to the second leaf node, thereby obtaining corresponding address information from the second leaf node. In a specific implementation process, the process of querying the IP address of the second leaf node and the process of obtaining address information about the IP address from the second leaf node may be implemented simultaneously or separately.

When querying the IP address of the second leaf node and obtaining the address information about the IP address to be queried are implemented separately, forwarding the query request containing at least the prefix of the IP address to be queried to the intermediate layer node in step 101 in the above embodiment may specifically be that: the first leaf node sends the query request containing the prefix of the IP address to be queried to an adjacent intermediate layer node.

In this case, obtaining, by the intermediate layer node, the IP address of the second leaf node according to the prefix of the IP address to be queried in step 102 in the above embodiment may specifically include: querying, by the intermediate layer node adjacent to the first leaf node, whether the prefix of the IP address is assigned by the intermediate layer node adjacent to the first leaf node itself, and if the prefix is assigned by the intermediate layer node adjacent to the first leaf node itself, sending, by an intermediate layer node adjacent to the second leaf node, the IP address of the second leaf node; otherwise, successively forwarding the query request containing the prefix of the IP address to be queried to an intermediate layer node on an upper layer until an intermediate layer node finds that the prefix of the IP address is assigned by the intermediate layer node itself, forwarding the query request containing the prefix of the IP address to be queried to an intermediate layer node on a lower layer corresponding to the prefix, and then sending a query result after an intermediate layer node finds the IP address of the second leaf node. In the above step, when receiving the query request containing the prefix of the IP address to be queried, a root node of the intermediate layer node queries an intermediate layer node corresponding to the prefix according to the prefix of the IP address, and successively forwards the query request containing the prefix of the IP address to be queried to the intermediate layer on a lower layer corresponding to the prefix.

In the above embodiment, the first leaf node finds that the IP address to be queried is not an IP address assigned by the first leaf node itself and queries intermediate layer nodes successively. There is another embodiment where the first leaf node sends a query request directly to a root node when finding that the IP address to be queried is not an IP address assigned by the first leaf node itself, and the forwarding the query request containing at least the prefix of the IP address to be queried to the intermediate layer node in step 101 in the embodiment shown in FIG. 1 may specifically be that: the first leaf node sends the query request containing the prefix of the IP address to be queried to the root node of the intermediate layer node.

In this case, the obtaining, by the intermediate layer node, the IP address of the second leaf node according to the prefix of the IP address to be queried in step 102 in the embodiment shown in FIG. 1 may specifically include: querying, by the root node of the intermediate layer node, an intermediate layer node corresponding to the prefix according to the prefix of the IP address, successively forwarding the query request containing the prefix of the IP address to be queried to the intermediate layer node on a lower layer corresponding to the prefix, and sending a query result after an intermediate layer node finds the IP address of the second leaf node.

In the above specific embodiments, the intermediate layer node adjacent to the second leaf node finds the IP address of the second leaf node and sends the query result. The above method may further include a step of forwarding the IP address of the second leaf node by the first leaf node to the user equipment after the first leaf node receives the IP address of the second leaf node. In this case, the user equipment may send a query request message containing the IP address to be queried directly to the second leaf node. The step 103 may specifically be that: the second leaf node sends the address information about the IP address after receiving the query request message containing the IP address to be queried sent by the user equipment.

In the above embodiment, after the first leaf node receives the IP address of the second leaf node, the method may further include storing a corresponding relationship between the prefix of the IP address to be queried and the IP address of the second leaf node for future use. In this case, before sending the query request containing the prefix of the IP address to be queried to the intermediate layer node in step 102 in the embodiment shown in FIG. 1 may further include: querying, by the first leaf node, whether the IP address of the second leaf node corresponding to the prefix of the IP address to be queried is stored, and when the IP address of the second leaf node corresponding to the prefix of the IP address to be queried is stored, sending the IP address of the second leaf node to the user equipment; otherwise, sending the query request containing the prefix of the IP address to be queried to the intermediate layer node. Query time may be effectively reduced by storing queried information.

In the above embodiment, the IP address of the second leaf node and the address information about the IP address to be queried are respectively obtained by using two step procedures. In addition, they may also be obtained by using one step procedure. That is, the query request message containing the IP address to be queried may be directly sent to the intermediate layer nodes, and the intermediate layer node obtain the IP address of the second leaf node according to the prefix of the IP address, and directly send the query request message to the second leaf node. That is, the sending the query request containing at least the prefix of the IP address to be queried to the intermediate layer node in the step 101 shown in FIG. 1 is specifically that: the first leaf node sends the query request containing the IP address to be queried to adjacent intermediate layer nodes.

In this case, the obtaining, by the intermediate layer node, the IP address of the second leaf node according to the prefix of the IP address to be queried in step 102 in the above embodiment specifically includes: querying, by the intermediate layer node adjacent to the first leaf node, whether the prefix of the IP address is assigned by the intermediate layer node adjacent to the first leaf node itself, and if the prefix is assigned by intermediate layer node adjacent to the first leaf node itself, obtaining the IP address of the second leaf node and forwarding the query request containing the IP address to be queried to the second leaf node; otherwise, successively forwarding the query request containing the IP address to be queried to an intermediate layer node on an upper layer until an intermediate layer node finds that the prefix of the IP address to be queried is assigned by the intermediate layer node itself, forwarding the query request containing the IP address to be queried to an intermediate layer node on a lower layer corresponding to the prefix to send the query request containing the IP address to be queried to the second leaf node after obtaining the IP address of the second leaf node.

Specifically, in the above step, when receiving the query request containing the IP address to be queried, a root node of the intermediate layer node queries an intermediate layer node corresponding to the prefix according to the prefix of the IP address, and successively forwards the query request containing the IP address to be queried to the intermediate layer on a lower layer corresponding to the prefix.

In the above embodiment, the first leaf node finds that the IP address to be queried is not an IP address assigned by the first leaf node itself and queries intermediate layer nodes successively. There is another embodiment where the first leaf node sends a query request directly to a root node when finding that the IP address to be queried is not an IP address assigned by the first leaf node itself, and the forwarding the query request containing at least the prefix of the IP address to be queried to the intermediate layer node in step 101 in the embodiment shown in FIG. 1 is specifically that: the first leaf node sends the query request containing the IP address to be queried to the root node of the intermediate layer node.

In this case, the obtaining, by the intermediate layer node, the IP address of the second leaf node according to the prefix of the IP address to be queried in step 102 in the embodiment shown in FIG. 1 may specifically include: querying, by the root node of the intermediate layer node, an intermediate layer node corresponding to the prefix according to the prefix of the IP address, successively forwarding the query request containing the prefix of the IP address to be queried to the intermediate layer node on a lower layer corresponding to the prefix, so as to send the query request containing the IP address to be queried to the second leaf node after obtaining the IP address of the second leaf node.

Based on the above embodiment, the second leaf node sends the address information about the IP address to be queried after receiving the query request message containing the IP address to be queried sent by the intermediate layer node adjacent thereto.

Further, the address information about the IP address to be queried is forwarded by the first leaf node to the user equipment; in this case, the first leaf node may store the corresponding relationship between the prefix of the IP address to be queried and the IP address of the second leaf node. Therefore, in step 101, before the sending the query request containing the IP address to be queried to the intermediate layer node, the method may further include querying, by the first leaf node, whether the IP address of the second leaf node corresponding to the prefix of the IP address to be queried is stored, and when the IP address of the second leaf node corresponding to the prefix of the IP address to be queried is stored, sending the query request containing the IP address to be queried to the second leaf node according to the IP address of the second leaf node; otherwise, sending the query request containing the IP address to be queried to the intermediate layer node. That is, the first leaf node stores the corresponding relationship between the prefix of the queried IP address and the corresponding second leaf node after querying the address information about the IP address, which may improve query efficiency for future queries.

In the above embodiments, the sending, by the second leaf node, the address information about the IP address may specifically be that: the second leaf node queries a user information database for user information corresponding to the IP address according to the IP address to be queried, where the user information is the address information about the IP address, and the IP address is assigned to the user equipment by the second leaf node. In addition, in the embodiments of the present invention, the assigning, by the second leaf node, the IP address to the user equipment may specifically be that: the second leaf node generates an IP address of the user equipment according to identity information of the user equipment and prefix information of the second leaf node; or the second leaf node generates the IP address of the user equipment according to a MAC address of the user equipment and the prefix information of the second leaf node.

The first leaf node and the second leaf node in the embodiments of the present invention are relative concepts, where in a process of querying address information about an IP address, a leaf node receiving an IP address query sent by user equipment is the first leaf node, and a leaf node assigning the IP address to be queried is the second leaf node.

Figure 2:
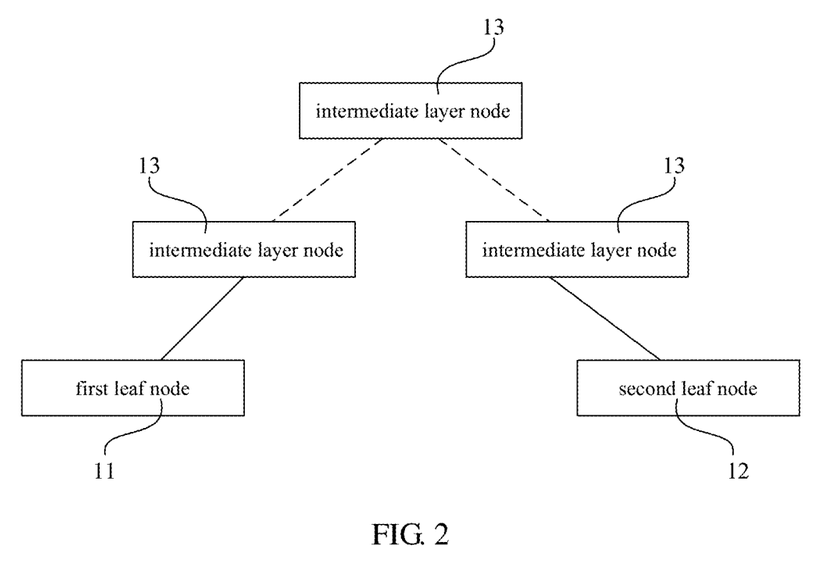
FIG. 2 is a schematic structural diagram of an embodiment of an Internet system according to the present invention.

Embodiments of the present invention further provide an Internet system which is capable of implementing the Internet address information processing method of the above embodiments. FIG. 2 is a schematic structural diagram of an embodiment of an Internet system according to the present invention. As shown in FIG. 2, the system includes a first leaf node 11, a second leaf node 12, and at least one intermediate layer node 13, where the first leaf node 11 is configured to receive a query request message containing an IP address to be queried sent by user equipment, query whether the IP address to be queried is an IP address assigned by the first leaf node; and if yes, send address information about the IP address to be queried to the user equipment; if no, send a query request containing at least a prefix of the IP address to be queried to the intermediate layer node, where the intermediate layer node 13 stores an IP address prefix of the intermediate layer node 13 itself and IP address prefixes assigned by the intermediate layer node 13 itself; the intermediate layer node 13 is configured to obtain an IP address of the second leaf node 12 according to the prefix of the IP address to be queried, where the second leaf node 12 is a node assigning the IP address to be queried to the user equipment, and stores address information about the IP address to be queried; and the second leaf node 12 is further configured to send the address information about the IP address after receiving the query request message containing the IP address to be queried.

The Internet system provided by the embodiment of the present invention divides an Internet system into leaf nodes and intermediate layer nodes, where after receiving a query request message initiated by user equipment for querying address information about an IP address, a first leaf node determines an IP address of a second leaf node assigning the IP address according to a prefix of an IP address to be queried, and obtains the address information about the IP address to be queried from the second leaf node. The second leaf node is a node directly responsible for assigning IP addresses; therefore, real-time query for address information about IP addresses can be implemented.

In addition, the second leaf node is configured to generate an IP address of the user equipment according to identity information of the user equipment and prefix information of the second leaf node; or the second leaf node generates the IP address of the user equipment according to a MAC address of the user equipment and the prefix information of the second leaf node, and stores the IP address assigned to the user equipment and user information corresponding to the IP address assigned to the user equipment, where the user information is the address information about the IP address. The intermediate layer node is further configured to assign an IP address prefix to a lower layer node, and store the IP address prefix assigned to the lower layer node and IP addresses of an upper layer node and the lower layer node.

In addition, the first leaf node 11 is further configured to, after receiving the address information about the IP address to be queried sent by the second leaf node 12, store a corresponding relationship between the prefix of the IP address to be queried and the IP address of the second leaf node 12; and before sending the query request containing the IP address to be queried to the intermediate layer node, query whether the IP address of the second leaf node 12 corresponding to the prefix of the IP address to be queried is stored; when the IP address of the second leaf node 12 corresponding to the prefix of the IP address to be queried is stored, send the query request containing the IP address to be queried to the second leaf node 12 according to the IP address of the second leaf node 12; otherwise, send the query request containing the IP address to be queried to the intermediate layer node.

Figure 3:
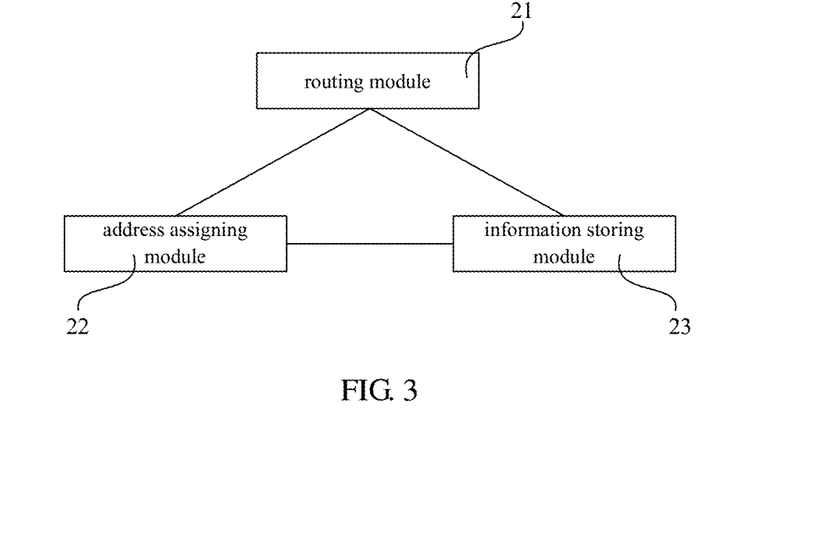
FIG. 3 is a schematic structural diagram of an embodiment of an Internet address information processing apparatus according to the present invention.

Embodiments of the present further provide an Internet address information processing apparatus, where the apparatus is equivalent to a leaf node in the above embodiments. FIG. 3 is a schematic structural diagram of an embodiment of an Internet address information processing apparatus according to the present invention. As shown in FIG. 3, the apparatus includes a routing module 21, an address assigning module 22, and an information storing module 23, where the routing module 21 is configured to implement a data link with user equipment and an upper layer node, and receive an IP address configuration request message sent by the user equipment, receive a query request message containing an IP address to be queried sent by the user equipment, or forward the query request message containing an IP address to be queried to the upper layer node; the address assigning module 22 is configured to receive the IP address configuration request message forwarded by the routing module and then assign an IP address to the user equipment; and the information storing module 23 is configured to store the IP address assigned by the address assigning module to the user equipment and user information corresponding to the IP address, and when receiving the query request message containing the IP address to be queried, send the user information corresponding to the IP address to be queried, where the user information is address information about the IP address.

The Internet address information processing apparatus provided by the above embodiment of the present invention is equivalent to a leaf node of an Internet system, where the node is directly connected to user equipment, and is capable of assigning an IP address to the user equipment, storing the assigned IP address and user information corresponding to the IP address. The user information is address information about the IP address. Therefore, assigning situation of IP addresses may be recorded in real time, which makes it possible to query address information about IP addresses in real time.

Figure 4:
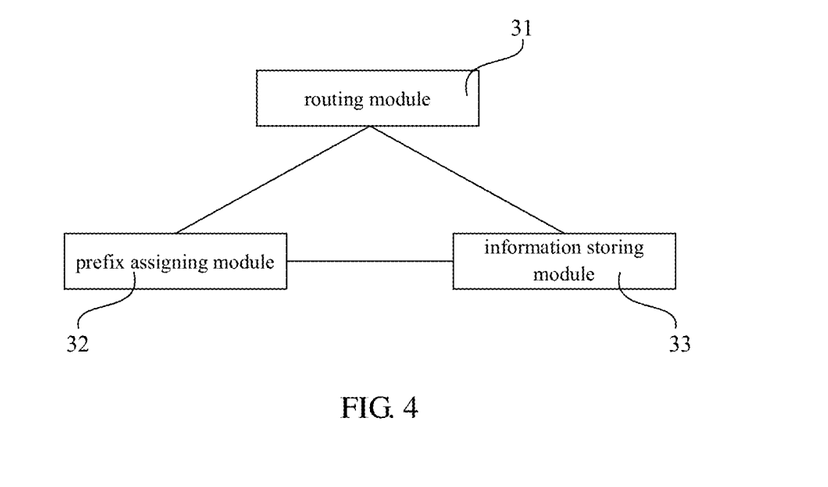
FIG. 4 is a schematic structural diagram of another Internet address information processing apparatus according to the present invention.

Embodiments of the present invention further provide another Internet address information processing apparatus which is equivalent to the intermediate layer node in the above embodiments. FIG. 4 is a schematic structural diagram of another Internet address information processing apparatus according to the present invention. As shown in FIG. 4, the apparatus includes a routing module 31, a prefix assigning module 32, and an information storing module 33, where the routing module 31 is configured to implement a data link with an upper layer node or a lower layer node in an Internet system, receive an IP address prefix configuration message sent by the upper layer node, after the prefix assigning module assigns an IP address prefix to the lower layer node, send the IP address prefix configuration message to the lower layer node, and receive a query request containing at least a prefix of an IP address to be queried sent by the upper layer node or the lower layer node; the prefix assigning module 32 is configured to receive the IP address prefix configuration message forwarded by the routing module, and assign an IP address prefix to the lower layer node according to an address prefix of itself assigned by the upper layer node; and the information storing module 33 is configured to store the IP address prefix assigned by the prefix assigning module to the lower layer node and an IP address of an information storing module of the lower layer node, and after receiving the query request containing at least the prefix of the IP address to be queried forwarded by the routing module, perform query and send a query result.

The Internet address information processing apparatus provided by the embodiment is equivalent to the intermediate layer node in the above embodiments, which is capable of assigning an IP address prefix to a lower layer node and storing the IP address prefix, and when receiving a query request message containing an IP address prefix, determining whether the IP address prefix is an IP address prefix assigned by the intermediate layer node itself, and successively query various layers according to the IP address prefix to quickly find a leaf node assigning the IP address to be queried.

Figure 5:
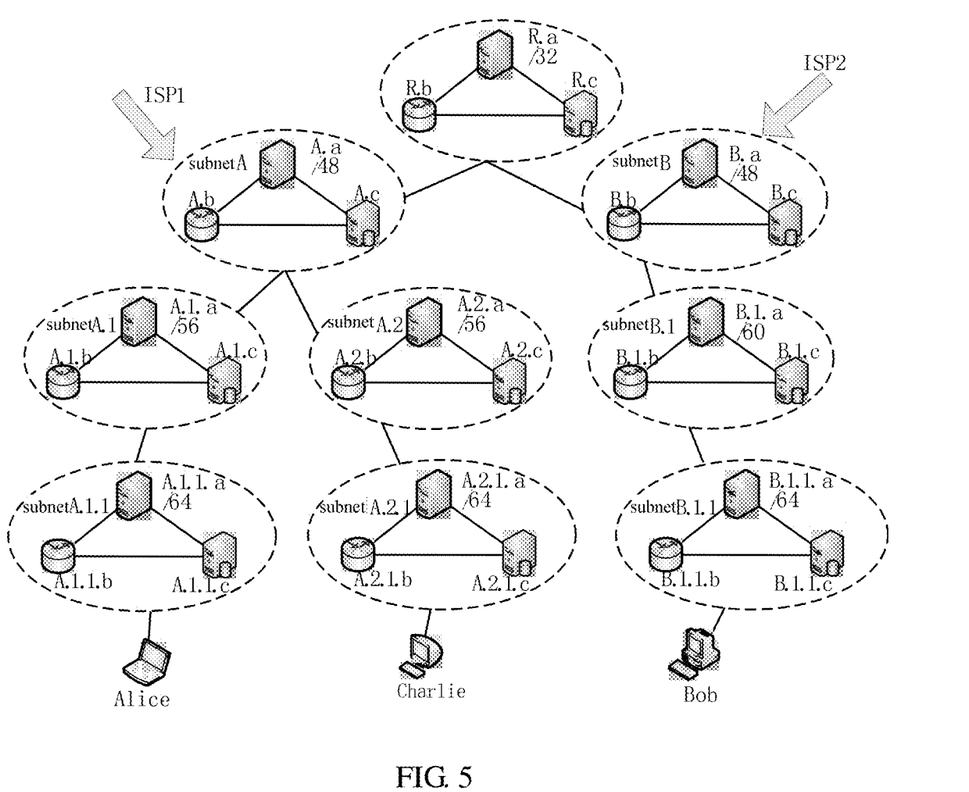
FIG. 5 is a system architecture diagram of a specific embodiment according to the present invention.

The following is a specific embodiment of the present, where the method, apparatus, and system provided by the above embodiments are applied to a specific embodiment in a real IPv6 system. FIG. 5 is a system architecture diagram of a specific embodiment according to the present invention. As shown in FIG. 5, the system includes leaf nodes and intermediate layer nodes, where the leaf nodes correspond to a subnet A.1.1, subnet A.2.1, and subnet B.1.1, the subnet A.1, subnet A.2, and subnet B.1 are intermediate layer nodes, and R.b is a subnet corresponding to a root node. Every subnet includes three logical devices, that is, a router device, a prefix proxy device, and an address information storing device.

The router device is the routing module in the above embodiments, such as A.b, A.1.*b*, and A.1.1.*b* in FIG. 5. The router device is mainly responsible for a data link between an upper and a lower logical sublayer, and forwards an IP address prefix configuration message, IP address configuration information, a query request message for querying address information about an IP address to a router device of the upper and the lower logical sublayers, which are then forwarded to corresponding devices.

For the intermediate layer node, the prefix proxy device may be equivalent to the prefix assigning module in the above embodiments, such as A.a, A.1.*a*, A.2.*a*, B.a, and B.1.*a* in FIG. 5. The device is mainly responsible for assigning a prefix to the lower layer node. For example, a prefix assigned by an upper layer network to the subnet A is 2001:250:6000::/48; a prefix assigned by A.a to the subnet A.1 is 2001:250:6000:1100::/56, and to the subnet A.2 is 2001:250:6000:1200::/56; a prefix assigned by A.1.*a* to the subnet A.1.1 is 2001:250:6000:1101::/64, and a prefix assigned by A.2.*a* to the subnet A.2.1 is 2001:250:6000:1201::/64. In addition, for the leaf node, the above prefix proxy device may be equivalent to the address assigning module, such as A.1.1.*a*, A.2.1.*a*, and B.1.1.*a* in FIG. 5, which are mainly responsible for assigning an IPv6 address of user equipment. For example, when a user Alice is accessed through the subnet A.1.1 and requests an IPv6 address, the device A.1.1.*a* generates an IPv6 address 2001:250:6000:1101:1234:5678:90ab:cdef according to currently obtained prefix information 2001:250:6000:1101::/64, and instructs Alice's user equipment to configure the address.

In addition, A.c, A.1.*c*, and A.2.*c* in FIG. 5 are address information storing devices for the intermediate layer nodes, and are responsible for storing prefix information of respective subnets and prefix information assigned to a lower layer node, and may further store information such as prefix information and IP address of an upper layer node. For example, the device A.1.*c* may record following information: a prefix 2001:250:6000::/48 of an upper layer node, an IPv6 address of the device A.c in the upper layer node, prefix information 2001:250:6000:1101::/64 and 2001:250:6000:1102::/64 of lower layer nodes, and IPv6 addresses of the device A.1.1.c and A.1.2.c in the lower layer node. For the leaf node, the address information storing device is responsible for storing an IP address of user equipment accessed through the subnet and user information about a user corresponding to the IP address, that is, address information about the IP address. For example, the device A.1.1.c may record an IP address used by the user Alice, and information such as user information, access port information, and access time.

The IP address prefixes and IP address information of the devices in the embodiment shown in FIG. 5 are shown in the following table:

| Network | Prefix | Device | IPv6 Address |
| --- | --- | --- | --- |
| Subnet A | 2001:250:6000::/48 | A.a | 2001:250:6000::1 |
| | | A.b | 2001:250:6000::2 |
| | | A.c | 2001:250:6000::3 |
| Subnet A.1 | 2001:250:6000:1100::/56 | A.1.a | 2001:250:6000:1100::1 |
| | | A.1.b | 2001:250:6000:1100::2 |
| | | A.1.c | 2001:250:6000:1100::3 |
| Subnet A.1.1 | 2001:250:6000:1101::/64 | A.1.1.a | 2001:250:6000:1101::1 |
| | | A.1.1.b | 2001:250:6000:1101::2 |
| | | A.1.1.c | 2001:250:6000:1101::3 |
| | | Alice | 2001:250:6000:1101:1234:5678:90ab:Cdef |
| Subnet A.2 | 2001:250:6000:1200::/56 | A.2.a | 2001:250:6000:1200::1 |
| | | A.2.b | 2001:250:6000:1200::2 |
| | | A.2.c | 2001:250:6000:1200::3 |
| Subnet A.2.1 | 2001:250:6000:1201::/64 | A.2.1.a | 2001:250:6000:1201::1 |
| | | A.2.1.b | 2001:250:6000:1201::2 |
| | | A.2.1.c | 2001:250:6000:1201::3 |
| | | Charlie | 2001:250:6000:201:5678:90ab:cdef:1234 |
| Subnet B | 3001:250:6000::/48 | B.a | 3001:250:6000::1 |
| | | B.b | 3001:250:6000::2 |
| | | B.c | 3001:250:6000::3 |
| Subnet B.1 | 3001:250:6000:1110::/60 | B.1.a | 3001:250:6000:1110::1 |
| | | B.1.b | 3001:250:6000:1110::2 |
| | | B.1.c | 3001:250:6000:1110::3 |
| Subnet B.1.1 | 3001:250:6000:1111::/64 | B.1.1.a | 3001:250:6000:1111::1 |
| | | B.1.1.b | 3001:250:6000:1111::2 |
| | | B.1.1.c | 3001:250:6000:1111::3 |
| | | Bob | 3001:250:6000:1111:90ab:cdef:1234:5678 |

In the above embodiments, the prefix proxy device of the intermediate layer node is responsible for assigning an IP address prefix, and the address information storing device thereof is responsible for storing the prefix of the intermediate layer node itself, the IP address prefix assigned to the lower layer node, and the IP address prefix of the upper layer subnet. The information is stored in a specific format shown in the following table:

| | |
| --- | --- |
| Prefix of an upper layer node | Address of an address information storing device of an upper layer subnet |
| Prefix of a lower layer node 1 | Address of an address information storing device of a lower layer subnet 1 |
| Prefix of a lower layer node 2 | Address of an address information storing device of a lower layer subnet 2 |
| ... | ... |

The prefix proxy device of the leaf node is mainly responsible for assigning an IP address to the user equipment, which generates a corresponding IPv6 address according to the current prefix, and sends the assigned IP address to the user equipment. The address information storing device is responsible for storing the assigned IP address and corresponding user information (that is, address information about the IP address). The user information may include user name, identity information (for example, an identity card number), access address information, and access port information. A specific information storage format is as follows:

| | |
| --- | --- |
| IPv6 address (may be the last 64 bits) | User information |
| IPv6 address (may be the last 64 bits) | User information |
| IPv6 address (may be the last 64 bits) | User information |
| ... | ... |

In order to accelerate the query, the above information may be stored and sorted by an IPv6 address field, and then be queried by using a method such as dichotomy. In addition, in order to improve a prefix searching speed, a table may be cached by the address information storing device of the leaf node to record an IP address of a leaf node corresponding to an IP address prefix which has been queried within a period of time.

Specifically, the prefix proxy device of the leaf node may assign an IP address to the user equipment in the following modes.

In one mode, when user equipment requests IP address assignment, user information about a user of the user equipment is sent to the leaf node, such as identity information, and the prefix proxy device of the leaf node generates the last 64 bits of an IPv6 address according to the identity information. A CGA algorithm may be used as a specific generation algorithm, and a PKI system for public and private key management may be used. The generated last 64 bits of the IPv6 address is used together with the 64-bit prefix of the leaf node to generate a complete 128-bit IPv6 address. In addition, the address information storing device stores the generated 128-bit IPv6 address and user information, and sets up a mapping relationship therebetween, where the user information is address information about the IP address. This mode allows an identity of a user of user equipment to be checked by using the IPv6 address, and has a high security coefficient.

In another mode, the prefix proxy device generates the last 64 bits of an IPv6 address according to a MAC address of user equipment to use it together with the 64-bit prefix of the leaf node to generate a complete 128-bit IPv6 address; meanwhile, a user of the user equipment is required to provide user information, and the address information storing device stores the generated 128-bit IPv6 address and the user information, and sets up a mapping relationship therebetween. In addition, the last 64 bits of an IPv6 address of user equipment may also be generated randomly.

In the above modes of processing IP address information, a mapping relationship between an IP address of user equipment and user information is stored in an address information storing device and can be widely applied in IP address configuration of Internet service providers. When an Internet user accesses a webpage of an Internet service provider or uses a service provided thereby, the method provided by the above embodiments of the present invention may be used to query address information about the IP address of the user, that is, whether the user information using the IP address is consistent with information actually stated by the web page or service. This mode is capable of performing identity check for IP address uses without help of a third party. For example, if a user accesses a phishing website, the method provided by the embodiments of the present invention may be used to determine that the website is a phishing website.

In addition, common Internet users may not want to publicize the user information. For such users, when a leaf node receives an IP address assignment request, a prefix proxy device generates an IPv6 address randomly based on a current subnet prefix and assigns the IPv6 address to user equipment, where an address information storing device only records that the address is a legal address. Furthermore, according to IPv6 protocols, the user equipment may obtain prefix information of an access network by using a route announcement message, and then generate an IP address manually or automatically. Some malicious attackers use this defect to generate a large amount of "illegal" addresses. The method provided by the embodiments of the present invention may be used to determine whether an IP address is an "illegal" address.

Figure 6:
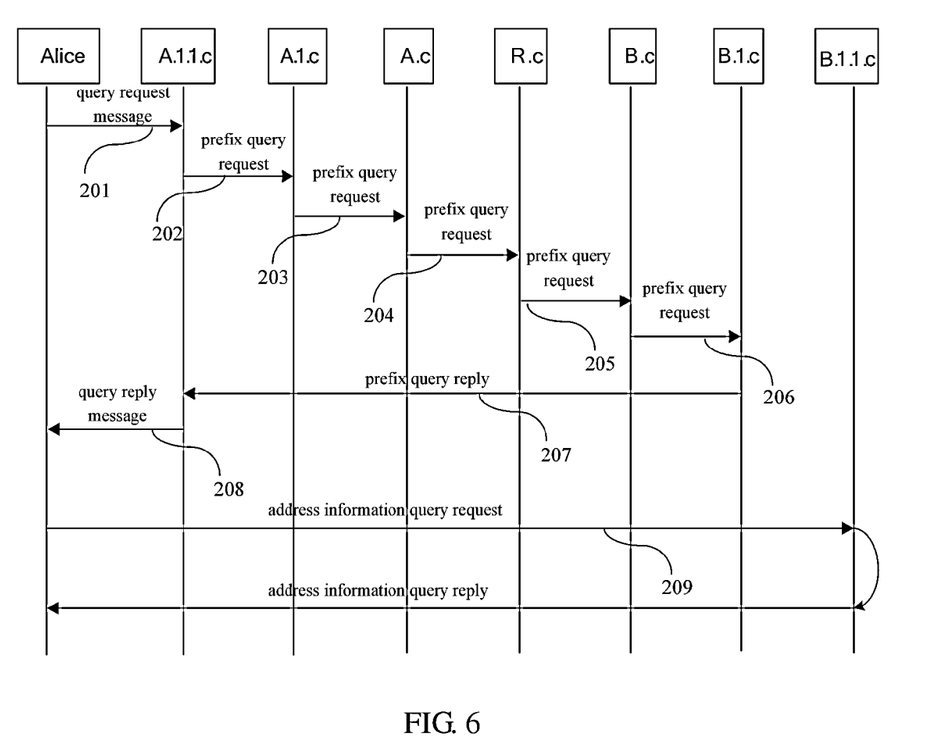
FIG. 6 is a schematic flowchart of a method for querying address information in a specific embodiment according to the present invention.

FIG. 6 is a schematic flowchart of a method for querying address information in a specific embodiment according to the present invention. As shown in FIG. 6, the method includes the following steps:

Step 201. Alice sends a query request message for querying address information about 3001:250:6000:1111:90ab:cdef: 1234:5678, that is, user information about the IP user, to an address information storing device (A.1.1.c) in an access network;

Step 202. After receiving the query request message, A.1.1.c first queries stored IP addresses to determine whether the IP address is an IP address assigned by A.1.1.c; if yes, sends address information about the IP address; if no, continues to search whether a cache has a matching query record; if yes and an IP address of a leaf node assigning the IPv6 address is recorded, which is specifically an IP address of an address information storing device of the leaf node, sends the IP address of the leaf node to the user equipment; otherwise, initiates a prefix query request to an upper layer node (A.1.c);

Step 203. After receiving the prefix query request, A.1.c first checks whether the prefix is a prefix assigned by the network; if yes, forwards the prefix query request to a subnet node (for example, A.1.2.c) corresponding to the prefix until the leaf node is found; if no, continues to forward the prefix query request to an upper layer node (A.c);

Step 204. A.c performs same operations as A.1.c;

Step 205. After receiving the prefix query request, a root node R.c finds a subnet (subnet B) corresponding to the prefix, and forwards the prefix query request to B.c;

Step 206. B.c continues to query and forwards the prefix query request to B.1.c;

Step 207. After receiving the prefix query request, B.1.c finds that the prefix perfectly matches a subnet prefix thereof, and the subnet is a leaf node (the 64-bit prefix perfectly matches), the node directly sends a prefix query reply to the prefix query request initiator (A.1.1.c), and carries IPv6 address of the leaf node (B.1.1.c) in a reply packet;

Step 208. After receiving the prefix query reply, A.1.1.c puts the IPv6 address of B.1.1.c in a query reply message, sends the query reply message to Alice, and adds a prefix query record in the cache to record the IPv6 address of B.1.1.c and the prefix thereof; and Step 209. After obtaining the IPv6 address of B.1.1.c, Alice directly initiates an address information query request to B.1.1.c, where an address information query reply sent by B.1.1.c contains user information (for example, the user is Bob) about the address 3001:250:6000:1111:90ab:cdef: 1234:5678, that is, address information about the IP address.

In the above embodiment, if Alice wants to query address information about an address 2001:250:6000:1201:5678: 90ab:cdef: 1234 and performs a recursive query upwards, it is not necessary to query the root node, and the query may be made downwards at the subnet A to find the node A.2.1.c storing the address information, thereby obtaining the address information. In the embodiment, in order to improve query efficiency, after initiating a query, a leaf node layer (for example, the device A.1.1.c) may cache and record the IP address (for example, the IP address of the device A.2.1.c and the device B.1.1.c) of the leaf node corresponding to the prefix, and may directly send the IP address of the corresponding leaf node when a query request of the same prefix is received again. In another embodiment, that is, in step 202, if A.1.1.c does not find a corresponding record stored by it, A.1.1.c directly forwards the prefix query request to the root node. That is, the step 202 to step 205 are combined into one step, where:

after receiving the query request message, A.1.1.c first queries stored IP addresses to determine whether the IP address is an IP address assigned by A.1.1.c; if yes, sends address information about the IP address; if no, continues to query whether the cache has a matching query record; if yes and an IP address of a leaf node assigning the IPv6 address is recorded, which is specifically an IP address of an address information storing device of the leaf node, sends the IP address of the leaf node to the user equipment; otherwise, initiates a prefix query request directly to the root node (R.c). In this solution, the address information storing device of the leaf node layer adds a record, that is, the IPv6 address of the root node (R.c).

The Internet address information processing method and apparatus and the Internet system provided by embodiments of the present invention divide an Internet system into leaf nodes and intermediate layer nodes, where after receiving a query request message initiated by user equipment for querying address information about an IP address, a first leaf node determines an IP address of a second leaf node assigning the IP address according to a prefix of an IP address to be queried, and obtains the address information about the IP address to be queried from the second leaf node. The second leaf node is a node directly responsible for assigning IP addresses; therefore, real-time query for address information about IP addresses can be implemented.

Persons skilled in the art should understand that all or a part of the steps of the method according to the embodiments may be implemented by a program instructing relevant hardware. The program may be stored in a computer readable storage medium. When the program is run, the steps of the method according to the embodiments are performed. The storage medium includes various mediums which are capable of storing program codes, such as a ROM, a RAM, a magnetic disk, or a CD-ROM.

Finally, it should be noted that the above embodiments are merely provided for describing the technical solutions of the present invention, but not intended to limit the present invention. It should be understood by persons skilled in the art that although the present invention has been described in detail with reference to the embodiments, modifications may be made to the technical solutions described in the embodiments, or equivalent replacements may be made to some technical features in the technical solutions; however, such modification or replacement does not make the essence of corresponding technical solutions exceed the spirit and scope of the technical solutions according to the embodiments of the present invention.

The invention claimed is:

1. An Internet address information processing method for a user equipment to query an IP address, wherein, a leaf node which assigns the IP address is unknown to the user equipment, the method comprising:

receiving, by a first leaf node, a query request message containing the IP address to be queried sent by the user equipment, querying whether the IP address is an IP address assigned by the first leaf node; and if yes, sending address information about the IP address to the user equipment; if no, sending a query request containing at least a prefix of the IP address to be queried to an intermediate layer node, wherein the intermediate layer node stores an IP address prefix of the intermediate layer node itself and IP address prefixes assigned by the intermediate layer node itself;

obtaining, by the intermediate layer node, an IP address of a second leaf node according to the prefix of the IP address to be queried to send the query request message containing the IP address to be queried to the second leaf node, wherein the second leaf node is a node assigning the IP address to be queried, and stores address information about the IP address assigned thereby; and sending, by the second leaf node, the address information about the IP address after receiving the query request message containing the IP address to be queried;

wherein, the sending the query request containing at least the prefix of the IP address to be queried to the intermediate layer node comprises:

sending, by the first leaf node, the query request containing the prefix of the IP address to be queried to an adjacent intermediate layer node;

and the obtaining, by the intermediate layer node, the IP address of the second leaf node according to the prefix of the IP address to be queried comprises:

querying, by the intermediate layer node adjacent to the first leaf node, whether the prefix of the IP address is assigned by the intermediate layer node; if the prefix of the IP address is assigned by the intermediate layer node, sending, by an intermediate layer node adjacent to the second leaf node, the IP address of the second leaf node; otherwise, successively forwarding the query request containing the prefix of the IP address to be queried to an intermediate layer node on an upper layer until an intermediate layer node finds that the prefix of the IP address is assigned by the intermediate layer node itself; forwarding the query request containing the prefix of the IP address to be queried to an intermediate layer node on a lower layer corresponding to the prefix; and sending a query result after an intermediate layer node finds the IP address of the second leaf node.

2. The Internet address information processing method according to claim 1, wherein the successively forwarding the query request containing the prefix of the IP address to be queried to the intermediate layer node on the upper layer until the intermediate layer node finds that the prefix of the IP address is assigned by the intermediate layer node; forwarding the query request containing the prefix of the IP address to be queried to the intermediate layer node on the lower layer corresponding to the prefix comprises:

when receiving the query request containing the prefix of the IP address to be queried, querying, by a root node of the intermediate layer node, an intermediate layer node corresponding to the prefix according to the prefix of the IP address, and successively forwarding the query request containing the prefix of the IP address to be queried to the intermediate layer on a lower layer corresponding to the prefix.

3. The Internet address information processing method according to claim 1, wherein the sending the query request containing at least the prefix of the IP address to be queried to the intermediate layer node comprises:

sending, by the first leaf node, the query request containing the prefix of the IP address to be queried to a root node of an intermediate layer node;

and the obtaining, by the intermediate layer node, the IP address of the second leaf node according to the prefix of the IP address to be queried comprises:

querying, by the root node of the intermediate layer node, an intermediate layer node corresponding to the prefix according to the prefix of the IP address, successively forwarding the query request containing the prefix of IP address to be queried to an intermediate layer node on a lower layer corresponding to the prefix, and sending a query result when an intermediate layer node finds the IP address of the second leaf node.

4. The Internet address information processing method according to claim 1, further comprising:

forwarding, by the first leaf node, the IP address of the second leaf node to the user equipment after receiving the IP address of the second leaf node;

and the sending, by the second leaf node, the address information about the IP address after receiving the query request message containing the IP address to be queried comprises:

sending, by the second leaf node, the address information about the IP address after receiving the query request message containing the IP address to be queried sent by the user equipment.

5. The Internet address information processing method according to claim 4, wherein after the first leaf node receives the IP address of the second leaf node, further comprising:

storing, by the first leaf node, a corresponding relationship between the prefix of the IP address to be queried and the IP address of the second leaf node;

and before sending the query request containing the prefix of the IP address to be queried to the intermediate layer node, further comprising:

querying, by the first leaf node, whether the IP address of the second leaf node corresponding to the prefix of the IP address to be queried is stored, and when the IP address of the second leaf node corresponding to the prefix of the IP address to be queried is stored, sending the IP address of the second leaf node to the user equipment; otherwise, sending the query request containing the prefix of the IP address to be queried to the intermediate layer node.

6. The Internet address information processing method according to claim 1, wherein the sending the query request containing at least the prefix of the IP address to be queried to the intermediate layer node comprises:

sending, by the first leaf node, the query request containing the IP address to be queried to an adjacent intermediate layer node;

and the obtaining, by the intermediate layer node, the IP address of the second leaf node according to the prefix of the IP address to be queried comprises:

querying, by the intermediate layer node adjacent to the first leaf node, whether the prefix of the IP address is assigned by the intermediate layer node itself; if the prefix of the IP address is assigned by the intermediate layer node itself, obtaining the IP address of the second leaf node and forwarding the query request containing the IP address to be queried to the second leaf node; otherwise, successively forwarding the query request containing the IP address to be queried to an intermediate layer node on an upper layer until an intermediate layer node finds that the prefix of the IP address to be queried is assigned by the intermediate layer node itself; forwarding the query request containing the IP address to be queried to an intermediate layer node on a lower layer corresponding to the prefix; and sending the query request containing the IP address to be queried to the second leaf node after obtaining the IP address of the second leaf node.

7. The Internet address information processing method according to claim 6, wherein the successively forwarding the query request containing the IP address to be queried to the intermediate layer node on the upper layer until an intermediate layer node finds that the prefix of the IP address is assigned by the intermediate layer node itself; forwarding the query request containing the IP address to be queried to the intermediate layer node on the lower layer corresponding to the prefix comprises:
when receiving the query request containing the IP address to be queried, querying, by a root node of the intermediate layer node, an intermediate layer node corresponding to the prefix according to the prefix of the IP address, and successively forwarding the query request containing the IP address to be queried to the intermediate layer on a lower layer corresponding to the prefix.

8. The Internet address information processing method according to claim 6, wherein sending, by the second leaf node, the address information about the IP address after receiving the query request message containing the IP address to be queried comprises:
sending, by the second leaf node, the address information about the IP address to be queried after receiving the query request message containing the IP address to be queried sent by the intermediate layer node adjacent thereto.

9. The Internet address information processing method according to claim 8, wherein the address information about the IP address to be queried is forwarded by the first leaf node to the user equipment, and the method further comprises:
storing, by the first leaf node, a corresponding relationship between the prefix of the IP address to be queried and the IP address of the second leaf node;
and before sending the query request containing the IP address to be queried to the intermediate layer node, further comprising:
querying, by the first leaf node, whether the IP address of the second leaf node corresponding to the prefix of the IP address to be queried is stored, and when the IP address of the second leaf node corresponding to the prefix of the IP address to be queried is stored, sending the query request containing the IP address to be queried to the second leaf node according to the IP address of the second leaf node; otherwise, sending the query request containing the IP address to be queried to the intermediate layer node.

10. The Internet address information processing method according to claim 1, wherein the sending the query request containing at least the prefix of the IP address to be queried to the intermediate layer node comprises:
sending, by the first leaf node, the query request containing the IP address to be queried to a root node of an intermediate layer node;
and the obtaining, by the intermediate layer node, the IP address of the second leaf node according to the prefix of the IP address to be queried comprises:
querying, by the root node of the intermediate layer node, an intermediate layer node corresponding to the prefix according to the prefix of the IP address, successively forwarding the query request containing the prefix of the IP address to be queried to an intermediate layer node on a lower layer corresponding to the prefix, and sending the query request containing the IP address to be queried to the second leaf node after obtaining the IP address of the second leaf node.

11. The Internet address information processing method according to claim 1, wherein the sending, by the second leaf node, the address information about the IP address comprises:
querying, by the second leaf node, a user information database for user information corresponding to the IP address according to the IP address to be queried, wherein the user information is the address information about the IP address, and the IP address is assigned by the second leaf node to the user equipment.

12. The Internet address information processing method according to claim 11, wherein the assigning, by the second leaf node, the IP address to the user equipment comprises:
generating, by the second leaf node, the IP address of the user equipment according to identity information of the user equipment and prefix information of the second leaf node; or
generating, by the second leaf node, the IP address of the user equipment according to a MAC address of the user equipment and prefix information of the second leaf node.

13. An Internet system, comprising a first leaf node, a second leaf node, and at least one intermediate layer node, wherein the first leaf node is configured to receive a query request message containing an IP address to be queried sent by a user equipment, wherein, a leaf node which assigns the IP address is unknown to the user equipment, query whether the IP address to be queried is an IP address assigned by the first leaf node; and if yes, send address information about the IP address to be queried to the user equipment; if no, send a query request containing at least a prefix of the IP address to be queried to the intermediate layer node, wherein the intermediate layer node stores an IP address prefix of the intermediate layer node itself and IP address prefixes assigned by the intermediate layer node itself;
the intermediate layer node is further configured to obtain an IP address of the second leaf node according to the prefix of the IP address to be queried, wherein the second leaf node is a node assigning the IP address to be queried to the user equipment, and stores address information about the IP address to be queried; and
the second leaf node is further configured to send the address information about the IP address after receiving the query request message containing the IP address to be queried;
wherein, the first leaf node sends the query request containing at least the prefix of the IP address to be queried to the intermediate layer node comprises:
sends the query request containing the prefix of the IP address to be queried to an adjacent intermediate layer node;
and the intermediate layer node obtains the IP address of the second leaf node according to the prefix of the IP address to be queried comprises:
the intermediate layer node adjacent to the first leaf node queries whether the prefix of the IP address is assigned by the intermediate layer node; if the prefix of the IP address is assigned by the intermediate layer node, an intermediate layer node adjacent to the second leaf node sends the IP address of the second leaf node; otherwise, the intermediate layer node adjacent to the first leaf node successively forwards the query request containing the prefix of the IP address to be queried to an intermediate layer node on an upper layer until an intermediate layer node finds that the prefix of the IP address is assigned by the intermediate layer node itself; then the corresponding intermediate layer node forwards the query request containing the prefix of the IP address to be queried to an intermediate layer node on a lower layer corresponding to the prefix; and the intermediate layer node adjacent to the second leaf node sends a query result after finding the IP address of the second leaf node.

14. The Internet system according to claim 13, wherein the second leaf node is configured to generate an IP address of the user equipment according to identity information of the user equipment and prefix information of the second leaf node; or generate the IP address of the user equipment according to a MAC address of the user equipment and the prefix information of the second leaf node, and store the IP address assigned to the user equipment and user information corresponding to the IP address assigned to the user equipment, wherein the user information is the address information about the IP address.

15. The Internet system according to claim 13, wherein the intermediate layer node is further configured to assign an IP address prefix to a lower layer node, and store the IP address prefix assigned to the lower layer node and IP addresses of an upper layer node and the lower layer node.

16. The Internet system according to claim 13, wherein the first leaf node is further configured to, after receiving the address information about the IP address to be queried sent by the second leaf node, store a corresponding relationship between the prefix of the IP address to be queried and the IP address of the second leaf node; and before sending the query request containing the IP address to be queried to the intermediate layer node, query whether the IP address of the second leaf node corresponding to the prefix of the IP address to be queried is stored; when the IP address of the second leaf node corresponding to the prefix of the IP address to be queried is stored, send the query request containing the IP address to be queried to the second leaf node according to the IP address of the second leaf node; otherwise, send the query request containing the IP address to be queried to the intermediate layer node.

17. An Internet address information processing apparatus, comprising a routing module, an address assigning module, and an information storing module, wherein the routing module is configured to implement a data link with user equipment and an upper layer node, and receive an IP address configuration request message sent by the user equipment, receive a query request message containing an IP address to be queried sent by the user equipment, or forward the query request message containing an IP address to be queried to the upper layer node;

the address assigning module is configured to receive the IP address configuration request message forwarded by the routing module and assign an IP address to the user equipment; and the information storing module is configured to store the IP address assigned by the address assigning module to the user equipment and user information corresponding to the IP address, and when receiving the query request message containing the IP address to be queried, query whether the IP address is an IP address assigned by the address assigning module, if yes, send the user information corresponding to the IP address to be queried, wherein the user information is address information about the IP address, if not, send a query request containing at least a prefix of the IP address to be queried to an intermediate layer node.

18. An Internet address information processing apparatus, comprising a routing module, a prefix assigning module, and an information storing module, wherein the routing module is configured to implement a data link with an upper layer node or a lower layer node in an Internet system, receive an IP address prefix configuration message sent by the upper layer node, after the prefix assigning module assigns an IP address prefix to the lower layer node, send the IP address prefix configuration message to the lower layer node, and receive a query request containing at least a prefix of an IP address to be queried sent by the upper layer node or the lower layer node;

the prefix assigning module is configured to receive the IP address prefix configuration message forwarded by the routing module, and assign an IP address prefix to the lower layer node according to the IP address prefix configuration message; and the information storing module is configured to store the IP address prefix assigned by the prefix assigning module to the lower layer node and an IP address of an information storing module of the lower layer node, and after receiving the query request containing at least the prefix of the IP address to be queried forwarded by the routing module, obtain an IP address of a leaf node which assigns the IP address to be queried, according to the prefix of the IP address to be queried, to send the query request containing the IP address to be queried to the leaf node.

* * * * *